United States Patent
Vaishnavi

(10) Patent No.: US 12,184,488 B2
(45) Date of Patent: Dec. 31, 2024

(54) METHOD AND APPARATUS INCLUDING EVENT TRIGGERED GOAL CHANGE FOR CONTROL LOOPS

(71) Applicant: Lenovo (Singapore) Pte. Limited, New Tech Park (SG)

(72) Inventor: Ishan Vaishnavi, Munich (DE)

(73) Assignee: Lenovo (Singapore) Pte. Limited, New Tech Park (SG)

( * ) Notice: Subject to any disclaimer, the term of this patent is extended or adjusted under 35 U.S.C. 154(b) by 0 days.

(21) Appl. No.: 18/025,483

(22) PCT Filed: Sep. 9, 2021

(86) PCT No.: PCT/US2021/049574
§ 371 (c)(1),
(2) Date: Mar. 9, 2023

(87) PCT Pub. No.: WO2022/056069
PCT Pub. Date: Mar. 17, 2022

(65) Prior Publication Data
US 2023/0327950 A1 Oct. 12, 2023

Related U.S. Application Data

(60) Provisional application No. 63/076,338, filed on Sep. 9, 2020.

(51) Int. Cl.
*H04L 41/0816* (2022.01)
*H04L 41/08* (2022.01)

(52) U.S. Cl.
CPC ...... *H04L 41/0816* (2013.01); *H04L 41/0886* (2013.01)

(58) Field of Classification Search
CPC ............ H04L 41/0816; H04L 41/0886; H04L 41/5009; H04L 41/0681; H04W 24/02; H04W 84/042
See application file for complete search history.

(56) References Cited

U.S. PATENT DOCUMENTS

| | | | | |
|---|---|---|---|---|
| 6,538,411 B1* | 3/2003 | Field | ................... | B62K 11/007 |
| | | | | 180/218 |
| 2002/0187802 A1* | 12/2002 | Agin | .................. | H04W 52/125 |
| | | | | 455/69 |

(Continued)

FOREIGN PATENT DOCUMENTS

WO 2022009187 A1 1/2022

OTHER PUBLICATIONS

ETSI ("Management services for communication service assurance; Requirements", TS 128535 V16.0.0, Jul. 2020 (Year: 2020).*

(Continued)

*Primary Examiner* — Ramy M Osman
(74) *Attorney, Agent, or Firm* — FIG. 1 Patents

(57) ABSTRACT

A method and apparatus are provided, in which execution of a managed entity is controlled. A control loop that is operated relative to the managed entity is established (1102), which links at least one monitored criteria to an assigned goal having a defined target value. Performance of the managed entity within the control loop is adjusted (1104), based upon a difference between a current value of the monitored criteria and the defined target value. One or more trigger conditions are associated (1106) with the control loop. A detection (1108) is then made as to whether a trigger condition associated with the control loop has been met. Upon detecting that the trigger condition associated with the control loop has been met, the goals assigned to the monitored criteria, that is linked to the control loop, which has the trigger condition that has been met is changed (1110).

20 Claims, 11 Drawing Sheets

(56) References Cited

U.S. PATENT DOCUMENTS

| | | | | |
|---|---|---|---|---|
| 2004/0082301 | A1* | 4/2004 | Agin | H04W 52/16 |
| | | | | 455/127.1 |
| 2007/0276545 | A1* | 11/2007 | Smirnov | G05B 13/024 |
| | | | | 700/282 |
| 2011/0276689 | A1* | 11/2011 | Rosen | H04M 15/06 |
| | | | | 709/224 |
| 2011/0288722 | A1* | 11/2011 | Nicosia | F02D 41/2422 |
| | | | | 701/31.4 |
| 2012/0215326 | A1* | 8/2012 | Brown | G05B 19/0426 |
| | | | | 700/42 |
| 2017/0134524 | A1* | 5/2017 | Ali-Tolppa | H04L 67/34 |
| 2017/0370762 | A1* | 12/2017 | Karimian-Sichany | |
| | | | | G01S 13/10 |
| 2018/0077023 | A1 | 3/2018 | Zhang | |
| 2018/0158079 | A1* | 6/2018 | Chu | G06N 5/022 |
| 2018/0260745 | A1* | 9/2018 | Jana | G06F 9/4806 |
| 2018/0345078 | A1* | 12/2018 | Blahnik | G06Q 50/22 |
| 2019/0138948 | A1* | 5/2019 | Janulewicz | G06N 7/01 |
| 2020/0390973 | A1* | 12/2020 | Wu | G16H 20/10 |
| 2021/0263115 | A1* | 8/2021 | Garber | A61B 5/6803 |
| 2022/0072428 | A1* | 3/2022 | Hu | A63F 13/822 |
| 2022/0377016 | A1* | 11/2022 | Chen | H04L 41/5003 |
| 2023/0125403 | A1* | 4/2023 | Simmons | G06N 3/08 |
| | | | | 340/573.1 |
| 2023/0291660 | A1 | 9/2023 | Vaishnavi | |
| 2023/0291783 | A1* | 9/2023 | Zhang | H04L 65/1069 |
| 2023/0327950 | A1* | 10/2023 | Vaishnavi | H04L 41/5009 |
| | | | | 709/223 |

OTHER PUBLICATIONS

ETSI ("Management services for communication service assurance; Requirements", TS 128535 V16.2.0, Jan. 2021 (Year: 2021).*

ETSI ("Management services for communication service assurance; Stage 2 and Stage 3", TS 128536 V16.0.0, Jul. 2020 (Year: 2020).*

PCT International Search Report for PCT/US2021/049574, Ishan Vaishnavi, mailing date—Dec. 20, 2021.

3GPP TS 28.535 V16.0.0 (Jul. 2020), 3rd Generation Partnership Project; Technical Specification Group Services and System Aspects; Management and Orchestration; Management Services for Communication Service Assurance; Requirements (Release 16).

3GPP TS 28.536 V16.0.0 (Jul. 2020), 3rd Generation Partnership Project; Technical Specification Group Services and System Aspects; Management and Orchestration; Management Services for Communication Service Assurance; Stage 2 and Stage 3 (Release 16).

ETSI GS ZSM-009-2 V0.3.1 (Jul. 2020), Zero-Touch Network and Service Management (ZSM); Closed-Loop Automation; Solutions.

ETSI GS ZSM-009-1 V0.8.5 (Aug. 2020), Zero-Touch Network and Service Management (ZSM); Closed-Loop Automation; Enablers.

3GPP TS 28.535 V17.2.0 (Jun. 2021), 3rd Generation Partnership Project; Technical Specification Group Services and System Aspects; Management and Orchestration; Management Services for Communication Service Assurance; Requirements (Release 17).

3GPP TS 28.536 V17.0.0 (Jun. 2021), 3rd Generation Partnership Project; Technical Specification Group Services and System Aspects; Management and Orchestration; Management Services for Communication Service Assurance; Stage 2 and Stage 3 (Release 17).

ETSI GS ZSM-009-2 V0.6.2 (Aug. 2021), Zero-Touch Network and Service Management (ZSM); Closed-Loop Automation; Solutions.

ETSI GS ZSM-009-1 V1.1.1 (Jun. 2021), Zero-Touch Network and Service Management (ZSM); Closed-Loop Automation; Part 1; Enablers.

Motorola Mobility UK Ltd.; ZSM (21)0000290; "ZSM009-2: Trigger based CL goal change".

Motorola Mobility; ZSM (20)0000236; "ZSM009-2: Add use case solution for enabling CL pause".

Motorola Mobility; ZSM (20)0000237; "ZSM009-1: Add MnS for enabling CL pause point".

3GPP TS 28.532 V16.4.0 (Jun. 2020), 3rd Generation Partnership Project; Technical Specification Group Services and System Aspects; Management and Orchestration; Generic Management Services (Release 16).

3GPP TS 28.541 V16.5.0 (Jun. 2020), 3rd Generation Partnership Project; Technical Specification Group Services and System Aspects; Management and Orchestration; 5G Network Resource Model (NRM); Stage 2 and Stage 3 (Release 16).

3GPP TS 28.550 V16.5.0 (Jul. 2020), 3rd Generation Partnership Project; Technical Specification Group Services and System Aspects; Management and Orchestration; Performance Assurance (Release 16).

3GPP TR 28.809 V0.4.0 (Jun. 2020), 3rd Generation Partnership Project; Technical Specification Group Services and System Aspects; Management and Orchestration; Study on Enhancement of Management Data Analytics (MDA) (Release 17).

ETSI GS ZSM-002 V1.1.1 (Aug. 2019), Zero-Touch Network and Service Management (ZSM); Reference Architecture.

* cited by examiner

| Source/Publication Date | Title | Description |
|---|---|---|
| TS28.536 v 16.0.0 | Management Services For Communication Service Assurance | The Interface And The Procedure Used To Set Assurance Goal |
| ETSI GS ZSM009-1 V0.8.5 Section 9 | Closed Loop Governance Service | This Is The Generic Service Specifying The Functionalities Used To Govern The Closed Control Loop. |
| ETSI GS ZSM002 V1.1.1 | Zero-Touch Network And Service Management (ZSM); Reference Architecture | The Architecture For E2E Management Domain And The Service Provided By Individual Management Domains. |

FIG. 5

| Service Name | Control Loop Goal Change Governance Service | |
|---|---|---|
| Service Functionalities | | |
| | Activate/Deactivate Triggers (M) | Activate/Deactivate A Trigger-CL Goal Change Association. This Could Additionally Include Activation/Deactivation Of Notifications, Logs etc. |
| | Manage Triggers (M) | Create, Read, Update, Delete Triggers-CL Goal Change Associations And Associated Details. This Functionality Manages Which Set Of Triggers Is Associated With Which Set Of Control Loops' Goals. |
| | Provide Notification For Trigger Received (O) | Provide A Notification When A Trigger Is Received |
| | Provide Notification For CL Goal Change (O) | Provide A Notification When A CL Goal Change Is Executed |
| | Log CL Goal Change (O) | Log A Change In CL Goal |

FIG. 7

METHOD AND APPARATUS INCLUDING EVENT TRIGGERED GOAL CHANGE FOR CONTROL LOOPS

FIELD OF THE INVENTION

The present disclosure is directed to a device having one or more control loops, which includes the monitoring of a detectible criteria and the management of the performance of the device in an attempt to cause the performance of the device relative to the detectible criteria to more closely coincide with a defined goal, where the desired performance of the device can change based upon an identified circumstance.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

As part of functioning within the network various operational parameters of the device need to be managed in order for device to more efficiently operate as intended, while allowing for information to be shared between the device and the network, and while also helping to better balance the desired performance of the device with the potential negative impact on other devices operating within the shared environment of the network.

In support of such a balancing, various target values can be identified, which when met may help better manage the overall performance of the device. In many cases, the target values can be related to a detectible criteria, which has been identified as being consistent with the desired performance. Several operating parameters may be correlated with the detectible criteria, where a control loop can be used to adjust the detectible criteria by adjusting the value of the correlated operating parameters. In some cases, it is possible that multiple goals that are being simultaneously managed may be desirable where better meeting one goal may be at odds with better meeting another one of the goals. In such a case, an overall goal and associated target values of the control loop can be defined to help better manage the potentially competing criteria. However, as operating circumstances within the network potentially change, the manner in which the potentially competing goals within a particular device are managed could also change.

The present inventors have recognized that it would be beneficial if the device having one or more control loops could be implemented with one or more respective goals that could be adjusted to better match different potential sets of circumstances, as identified through the detection of one or more associated trigger conditions, where the control loop could serve to manage the performance of the device, so as to better balance the potentially competing concerns in better meeting the overall operating performance for the device relative to different sets of circumstances through a detection of the associated trigger conditions.

SUMMARY

The present application provides a management entity for controlling an execution of a managed entity operating within a network. The management entity includes a controller adapted for establishing a control loop that is operated relative to the managed entity, which links at least one monitored criteria to a respective assigned goal having a defined target value, wherein performance of the managed entity is adjusted within the control loop based upon a determined difference between a current value of the at least one monitored criteria and the defined target value corresponding to the respective assigned goal. The controller is further adapted for associating one or more trigger conditions with the control loop, and detecting whether at least one of the one or more trigger conditions associated with the control loop has been met. Upon detecting that at least one of the one or more trigger conditions associated with the control loop has been met, at least one of the goals respectively assigned to the at least one monitored criteria, that is linked to the control loop, which has the trigger condition that has been met, is changed.

According to another possible embodiment, a method in a management entity for controlling an execution of a managed entity operating within a network is provided. The method includes establishing a control loop that is operated relative to the managed entity, which links at least one monitored criteria to a respective assigned goal having a defined target value. Performance of the managed entity within the control loop is adjusted, based upon a determined difference between a current value of the at least one monitored criteria and the defined target value corresponding to the respective assigned goal. One or more trigger conditions are associated with the control loop. A detection is then made as to whether at least one of the one or more trigger conditions associated with the control loop has been met. Upon detecting that at least one of the one or more trigger conditions associated with the control loop has been met, at least one of the goals respectively assigned to the at least one monitored criteria, that is linked to the control loop, which has the trigger condition that has been met is changed.

These and other features, and advantages of the present application are evident from the following description of one or more preferred embodiments, with reference to the accompanying drawings.

BRIEF DESCRIPTION OF THE DRAWINGS

FIG. 5 is a table identifying examples of instances in existing standards, which provide various examples of assurance control loops;

FIG. 7 is a table providing an exemplary management service specification, where each functionality may be specified independently;

DETAILED DESCRIPTION OF THE PREFERRED EMBODIMENT(S)

Figure 1:
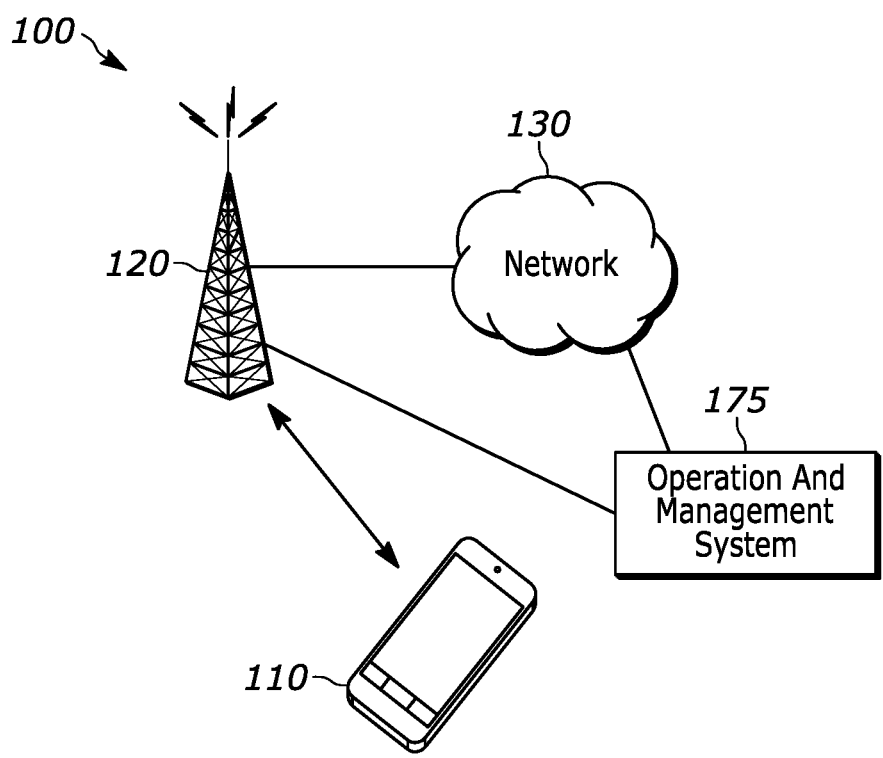
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide event triggered goal change(s) for one or more control loops.

FIG. 1 is an example block diagram of a system 100 according to a possible embodiment. The system 100 can include one or more management entities and one or more managed entities. In the particular embodiment illustrated, the system can include a wireless communication device 110, such as User Equipment (UE), a base station 120, such as an enhanced NodeB (eNB) or next generation NodeB (gNB), and a network 130. In the embodiment illustrated, the network is further associated with an operation and management system 175, that can serve to facilitate the implementation and control of one or both of the one or more management entities and/or the one or more managed entities. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In at least some instances, the management entity can be the user equipment. In at least some instances, the management entity can be a network entity. In at least some instances, portions of the management entity can be included as part of the user equipment and as part of a network entity. Similarly, the managed entity can be the user equipment, the network entity, and/or included as part of the user equipment and as part of a network entity. Still further, in some instances, the management entity can be the entity being managed.

As part of a management entity in controlling the execution of a managed entity operating within a network, one or more control loops can be established. The automated part of any control loops is generally assigned a goal or a condition to meet. The goal is usually an optimization criterion or a condition criterion that the control loop attempts to better meet. For example: the control loop attempts to better optimize the resources used in the network for a given managed entity or a key performance indicator (KPI) is identified that should never fall below a given threshold. In current specifications, this goal of a control loop is generally fixed and/or static. At least one concern is that the consumer of a managed entity (such as a network slice instance, network slice subnet instance, or a network function (NF) of a communication service) may want to better optimize different things at different times.

At least one concern with fixed closed loop goals can be highlighted with a hypothetical example. The telecommunication network typically experiences higher demand during the morning and lower demand during the night. In fifth generation (5G) networks this can be applicable to network slice subnets. The system could for example have an optimization criterion that looks like $$\text{minimize}(\alpha E - \beta QOE + \gamma COST)$$

where

E is the energy usage of the system

QOE is the quality of experience of the users of the system

COST is the total cost of operation of the system $\alpha, \beta, \gamma$ are weights This is just an example optimization criterion to demonstrate the problem. Over the course of the day the consumer of the network may want to better optimize energy usage in the night and maximize the QOE in the daytime and therefore would need to adjust $\alpha, \beta, \gamma$ accordingly. The current solution would require the consumer to reconfigure the goal at different times. This requires the consumer to actively manage the control loop itself, reducing the advantages of having a control loop for automation in the first place.

Historically, at least one basic solution is to configure new goals when required.

Another solution may provide for managing the lifecycle of control loops, such as bringing one loop down and another one up which has the new goal, as required.

Figure 2:
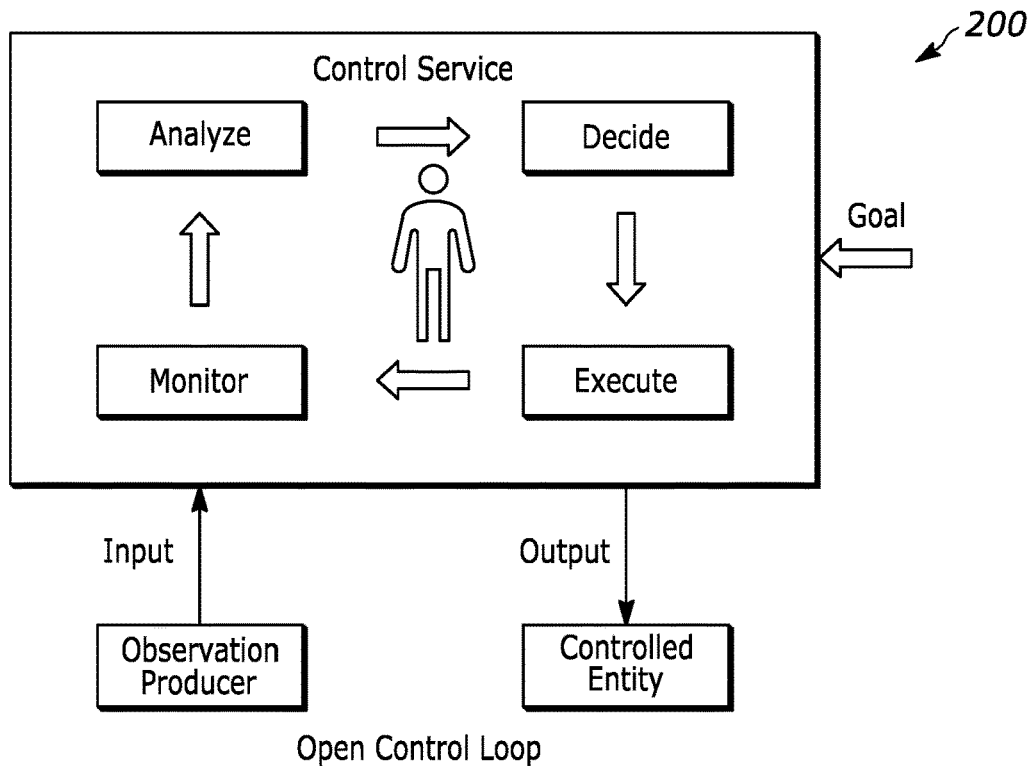
FIG. 2 is a block diagram of an exemplary open control loop.
Figure 3:
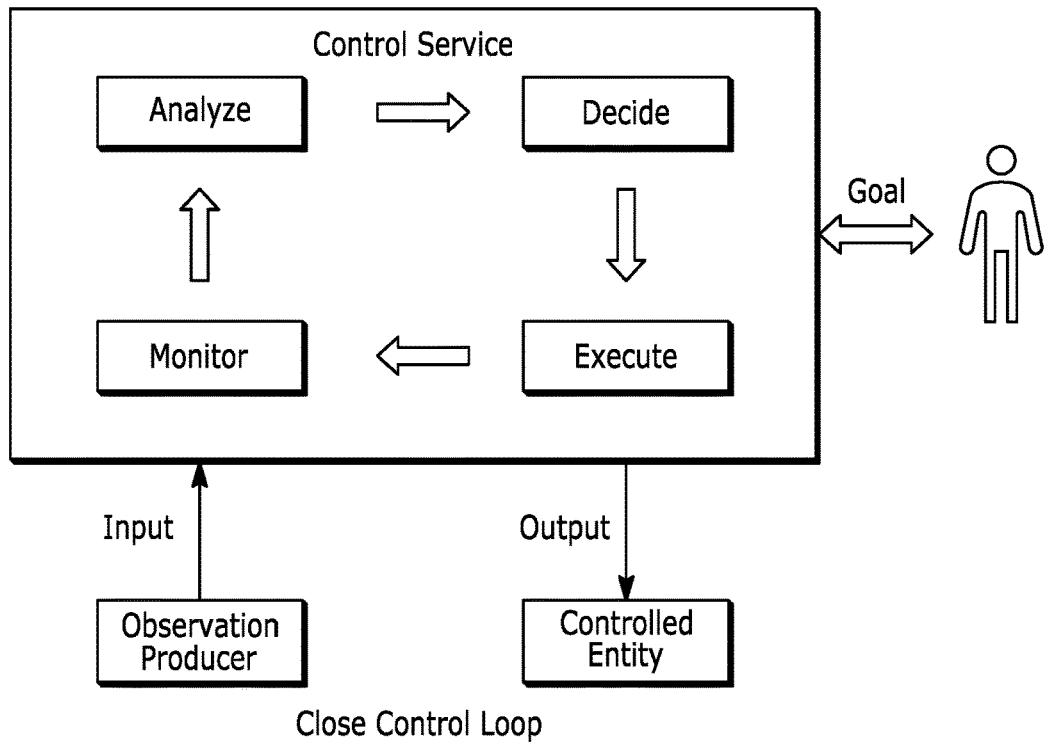
FIG. 3 is a block diagram of an exemplary closed control loop.

Work in Management, Orchestration and Charging for 3GPP systems (SA5) Technical Specification (TS) 28.535, and elsewhere defines the two extremes of open and closed control loops. Corresponding open control loops and closed control loops are respectively shown in FIGS. 2 and 3. As illustrated in FIG. 2, open control loops 200 involve the operator to be a part of at least one of the stages in the loop, while as illustrated in FIG. 3 in the closed control loop 300, the operator only defines a goal for the closed control loop and the loop once configured runs automatically. Both control loops attempt to control the status of a managed object trying to keep it to as close as possible to an operator specified goal.

Control Loop Models

Figure 4:
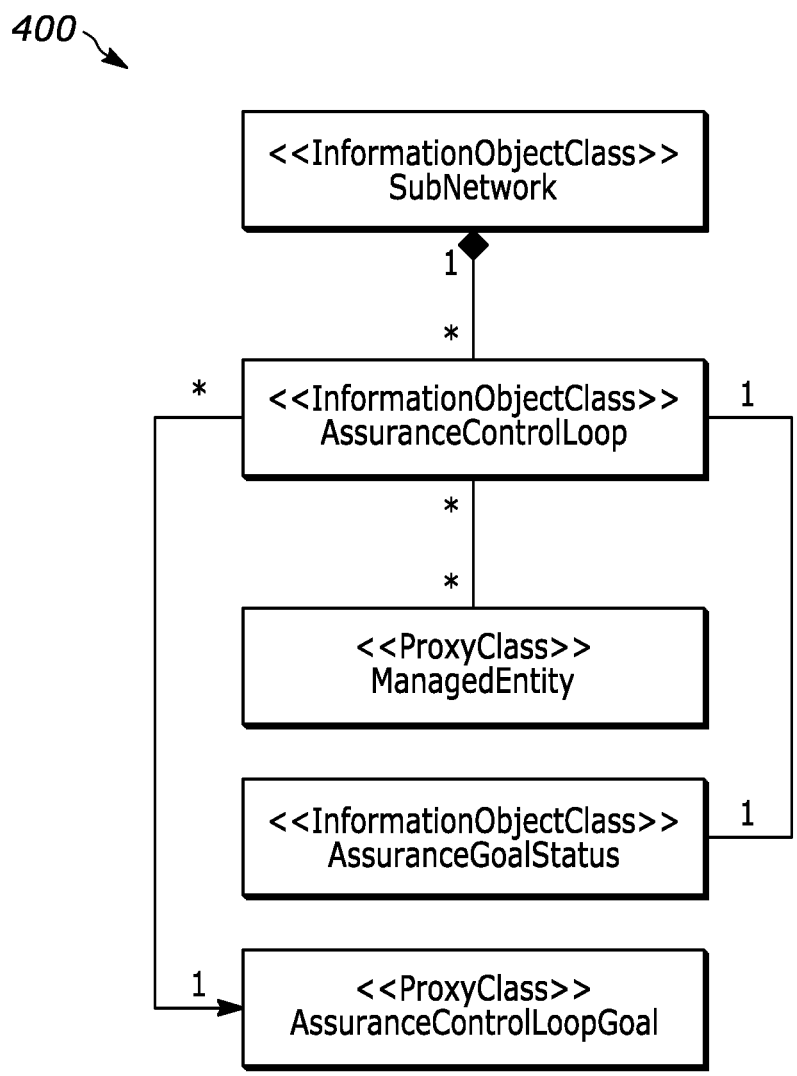
FIG. 4 is an exemplary model of an assurance control loop.

3GPP TS28.536 models an assurance control loops 400 as shown in FIG. 4. Each control loop is associated with multiple managed entities and typically one assurance goal and the status of the goal.

Closed Loop Models

In research there are multiple models of closed loops— example OODA (Observe, Orient, Decide, Act), MAPE-K (Monitor, Analyse, Plan, Execute over a shared Knowledge base) and so forth. In essence, closed control loops are composed of multiple stages—the number of stages may not be fixed—but the stages primarily involve: some sort of observation of the system, some sort of analytics of the observed information, a comparison with the desired state, a decision of what action to take based on the comparison and the execution of those decision. Stages may exchange information with each other over a knowledge base. However, stages may be skipped, or further stages may be added creating closed loops with any number of stages. The stages with observation of the system and execution of the decisions are often normally mandatory.

At least a couple of examples are illustrated in the table 500, illustrated in FIG. 5, which identifies examples of instances in existing standards, which provide various examples of assurance control loops. For example, in SA5 (TS28.536 v16.0.0) the existing implementations can include the ability to set a control loop (assurance control loop) goal.

In accordance with at least some embodiments of the present application the goal of control loops can be changed, based on a trigger in the network. The trigger could be any event in the network or the respective management domain. The present application provides a method, interface/management service and the implementing entity, which is used to manage and activate this trigger and manage the associated control loop (CL) state changes. The present application can further provide a notification with detailed status and relevant information when a state change happens.

This can enable dynamic changes in the control loops' goal under specific conditions or other events. For example, an energy can be better optimized during off peak hours to shut down managed elements (example: resources) not being used. The trigger here is the change in time of day or the network load and the closed loop goal transition can be to set a goal with a proportionally higher value of a for optimizing minimize ($\alpha E-\beta QOE+\gamma COST$) with network load decreasing below a certain threshold, or time of the day, and optionally decreasing a back, when network load increases again beyond a certain threshold.

Solution 1

In accordance with at least a first embodiment, a feature that enables the change in goal of a control loop based on a predefined trigger (event or condition) in the system can be provided. This set of features proposed in the present application can include features that may be required on vendor equipment/solutions/management domains that contain control loops. More specifically the set of features can include:

1. Manage (which can include create, read, update, delete or activate/deactivate) a (set of) trigger(s) (such as a condition or an event) in the network or the management domain associated with causing a change of a goal in a CL. Referred to hereafter as trigger-CL goal association. Trigger examples can include:

a. Values of KPIs or attributes in the network. Examples:
      i. downlink throughput >5 Mbps (KPI)
      ii. BeamTilt is set to 45° (attribute example from TS28.541)
   b. Events in the network. Example:
      i. New managed element identification (ID) 4 provisioning request received
      ii. Managed element ID 2 deactivated
   c. Time of the day
   d. Analytics recommendation
   e. Operator request
   f. (another) CL goal or state change
   g. Any notification in the network
   h. Any combination of the above
   Furthermore, the change in goal may be executed based on other conditions, for example:
      i. Values of KPIs or attributes in the network
      ii. Other events in the network. Example:
      iii. Existing or previous CL states or goals 2. For every change of goal, provide the ability to configure a notification to the operations, administration and maintenance (OAM)/Operator (Mandatory) or log it into the system logs.

Figure 6:
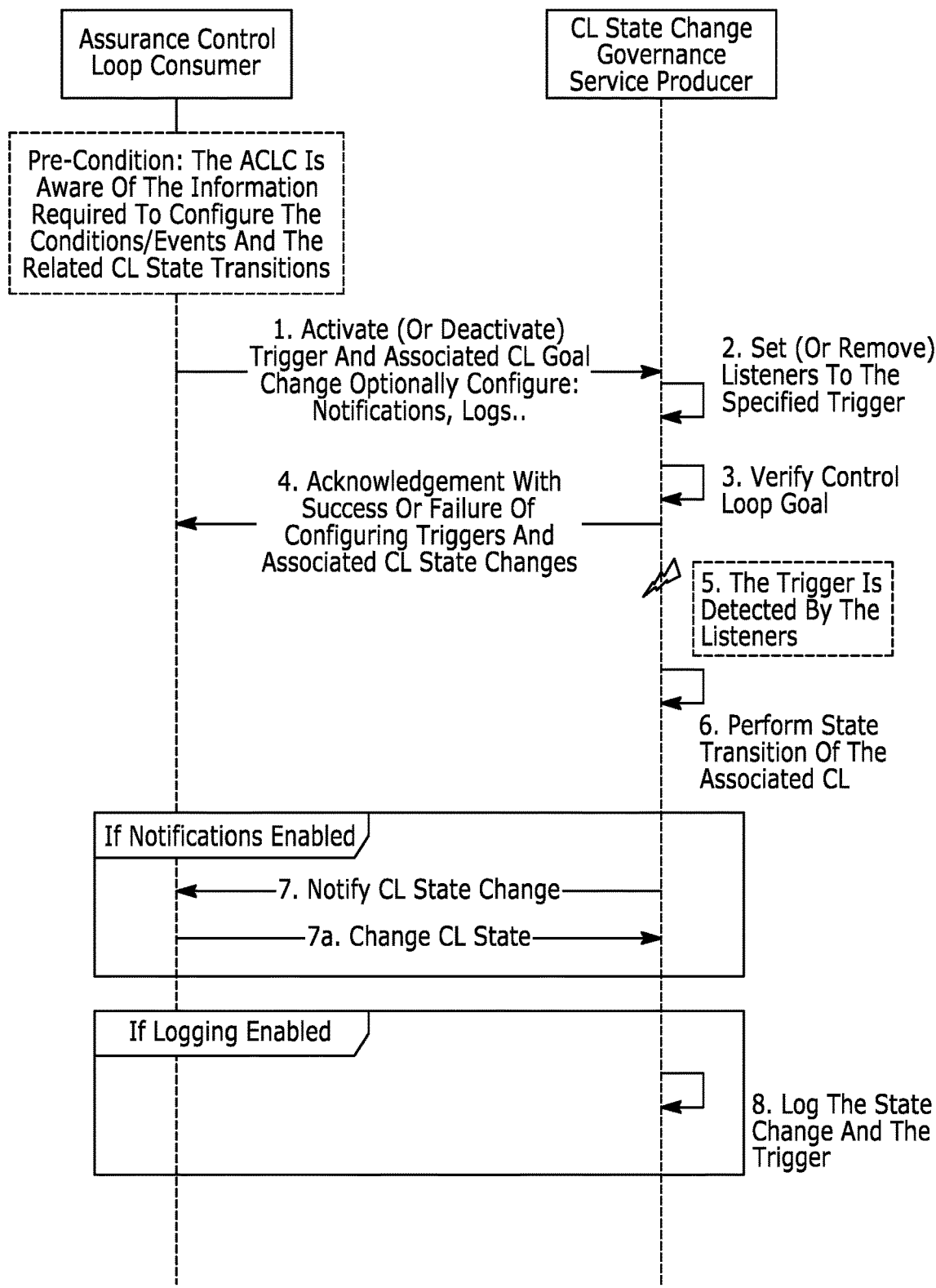
FIG. 6 is an exemplary scenario sequence diagram for enabling triggers in a control loop, in accordance with at least one embodiment of the present application.

An exemplary scenario sequence diagram of how such a solution could be used is shown in FIG. 6. More specifically, FIG. 6 illustrates an exemplary scenario sequence diagram 600 for enabling triggers in a control loop, in accordance with at least one embodiment of the present application.

Entities in the Sequence Diagram (FIG. 6)

The assurance control loop controller (ACLC) refers to the system administrator, operator (possibly acting via a dashboard), another control loop or any other entity (including software) that is authorized to configure the conditions in the CL goal change governance service producer (CLgcgsP) that influences the goal of a control loop.

The CL goal change governance service producer (CLgcgsP) is a logical entity that is identified in the present application as an entity that supports the interface to manage the configuration of triggers and CL goal change associations that when triggered can cause the goal of a control loop to be changed. The term service producer refers to the implementation of a given management service or functionality.

For example, the type of goal change may be overlapping or non-overlapping. Overlapping means that the two conditions could be activated simultaneously activating two different goals. In such a case, the goals overlap and the weight distribution over the two goals would also need to be configured. A non-overlapping goal indicates that as soon as the condition for the goal is met, the goal is activated, disabling the previous goal. A default goal may be specified if none of the conditions are met.

Note: This document shows a single logical entity, however, when realized, this could be implemented as a collection of multiple software or hardware entities.

Steps of the Sequence Diagram:

1. The ACLC can activate or deactivate a (set of) trigger (s) and associated CL loop goal change.
   Examples of triggers include (but are not limited to)
      Values of KPIs or attributes in the network. Examples:
         downlink throughput >5 Mbps (KPI)
         BeamTilt is set to 45° (attribute example from TS28.541)

Figure 8:
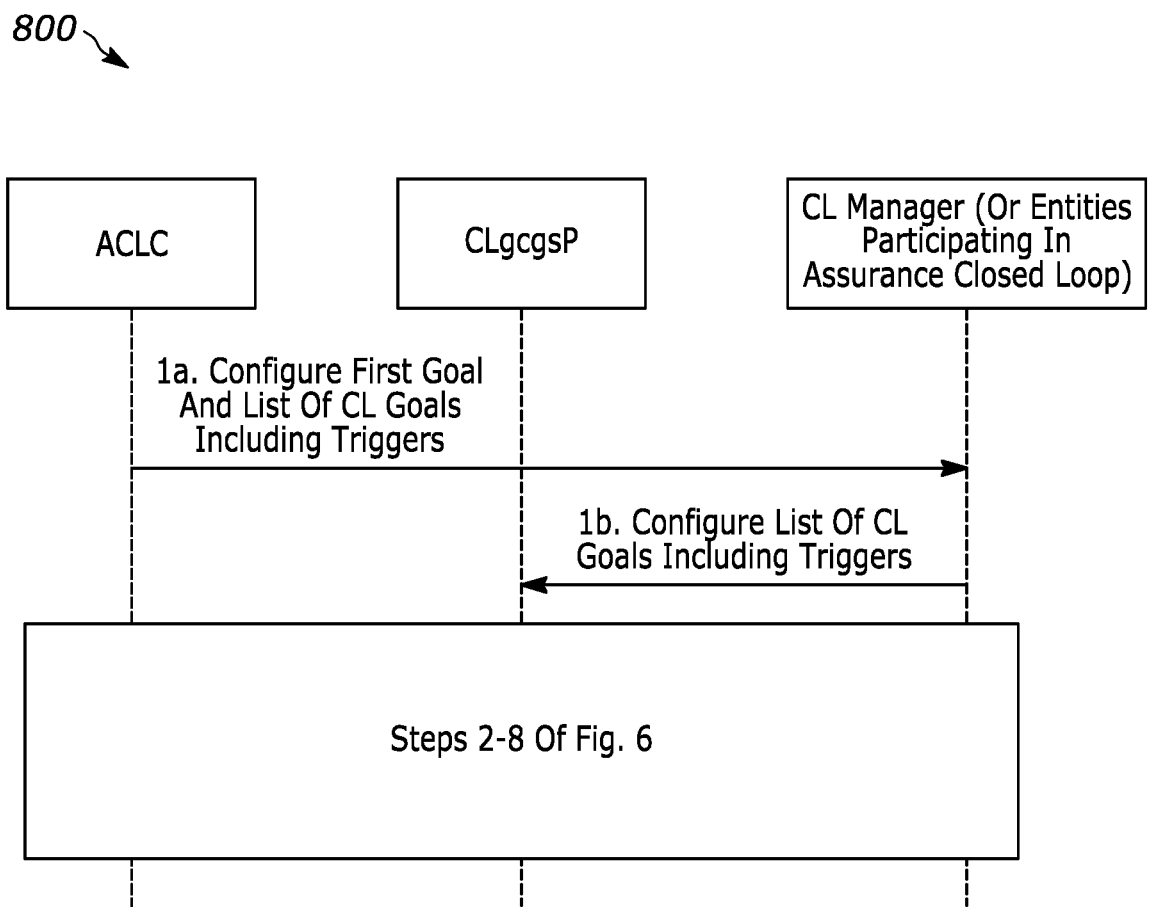
FIG. 8 is an exemplary scenario sequence diagram for enabling triggers in a control loop, in accordance with at least a further embodiment of the present application.
Figure 9:
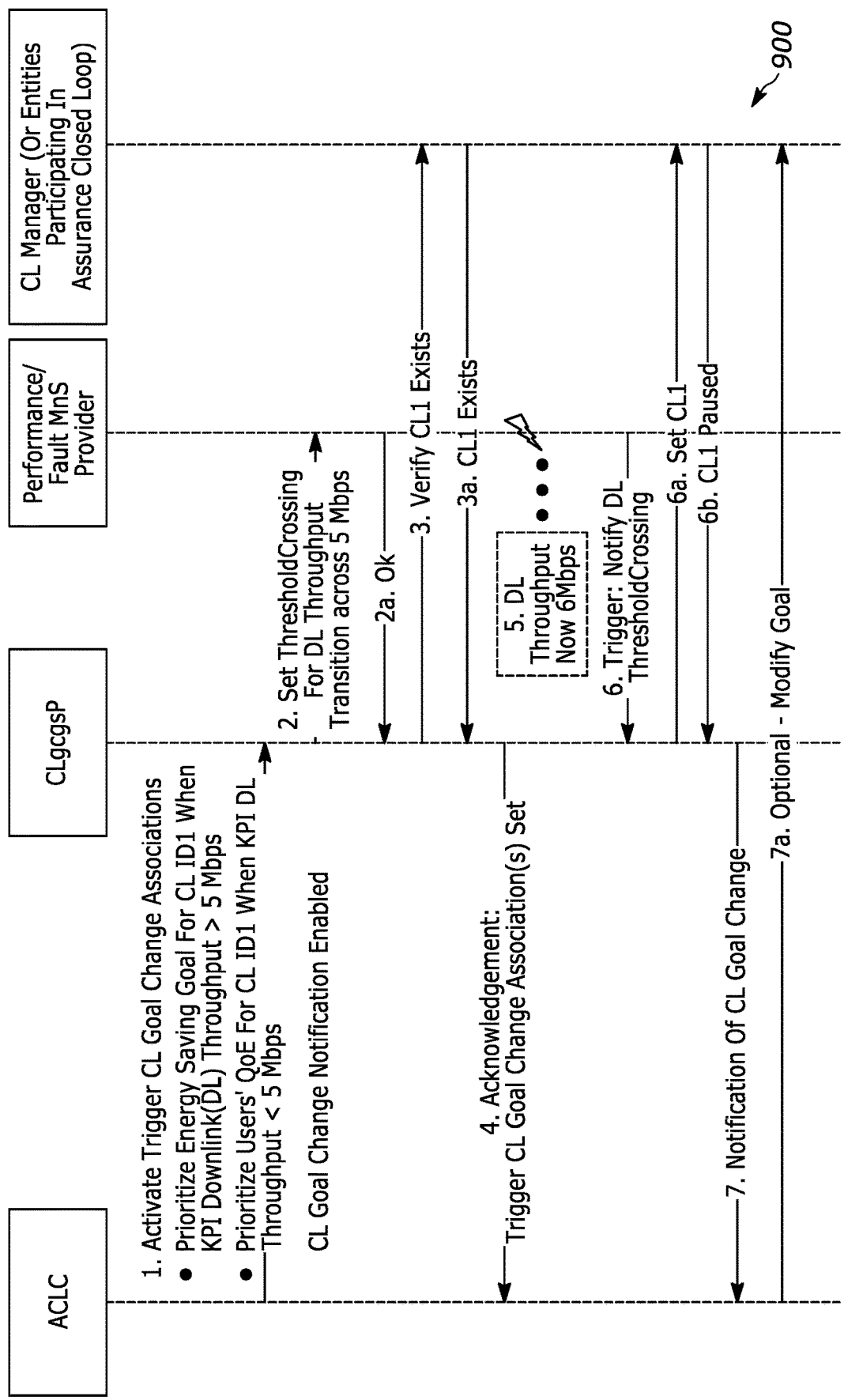
FIG. 9 is an exemplary scenario sequence diagram for enabling triggers in a control loop, such as for use in an implementation for use with the 3rd Generation Partnership Project (3GPP) Standard.

Events in the network. Example:
New managed element ID 4 provisioning request received
Managed element ID 2 deactivated
Time of the day
Operator request
(Other) CL goal changes or state transitions
Any combination of the above
To one or more triggers one or more control loop goal changes could be associated. Examples of control loops goal changes include:
Addition of new terms into the optimization term
Removal of terms
Change in weight assigned to the different aspects (or different terms) that form the goal
Configuration of an entirely new goal
Change of constraints
Change in conditional statements that form the goal
Optionally, the operator may configure (in addition to CL goal change)
Enabling (or disabling) notifications for CL goal change
Enabling (or disabling) logging for CL goal change
In case of deactivating the condition, a check may need to be performed if the condition has already been triggered and the corresponding goal set. In such a case while deactivating the condition the new goal may need to be specified.
2. It is further optionally possible, that the CLgcgsP could configure internal listeners to the trigger. This could be internal to network/management domain (MD) implementation.
3. It is still further optionally possible, that the CLgcgsP performs a sanity check internal to the network/MD. This could include things such as
Verifying that the associated CLs exist
Verifying that it has to authority to execute the requested CL goal change when triggered
Verifying that the goal is semantically and syntactically correct.
4. Acknowledgement to the ACLC.
5. The trigger is detected (by the listeners) in the network or the MD as configured in step 2.
6. Perform the goal change associated with the trigger. This can be done using for example the
Closed loop governance service of ETSI GS ZSM009-1 V0.8.5.
Goal configuration as specified in TS28.536 v16.0.0.
7. If notifications were enabled, notify the ACLC of goal change and reason (trigger)
a. The ACLC may issue a direct CL goal change request.
8. If logging was enabled, log goal change.
An example of a management service specification which supports this idea is shown in FIG. 7. More specifically, FIG. 7 illustrates a table 700 providing an exemplary management service specification, where each functionality may be specified independently.
Note: These functionalities can be spread over multiple control loop related management service specification/implementations. They may be specific to closed or open control loops.
Solution 2
In accordance with a further embodiment, where this embodiment can be viewed as a small modification of the preceding embodiment, where the initial configuration of the closed loop goal may instead of a single goal may include a list of goals with their respective activating conditions being configured in the closed loop manager. A closed loop manager is any entity that is responsible for configuring or governing a set of closed loops. For example, a producer (implementation) of the closed loop governance service. This embodiment is shown in FIG. 8, where more specifically FIG. 8 illustrates an exemplary scenario sequence diagram 800 for enabling triggers in a control loop, in accordance with at least a further embodiment of the present application. At least one difference can be seen in the following steps.
1a. The control loop (via the CL manager) can be configured with a list of CL goals.
1b. The CL manager can configure the triggers-CL goal change associations in the CLgcgsP.
Steps 2-8 can generally be the same as the preceding embodiment illustrated in FIG. 6.
Solution 3
FIG. 9 illustrates an exemplary scenario sequence diagram 900 for enabling triggers in a control loop, such as for use in an implementation for use with the 3rd Generation Partnership Project (3GPP) Standard.
More specifically, FIG. 9 shows one implementation that can be made specific to a 3GPP management domain. The explanation of the labels that refer to the steps of operation is as follows:
1. The ACLC activates a trigger related to downlink throughput on ME ID 1 and CL ID 1. When the downlink throughput rises above 5 Mbps, CL ID 1 should prioritize energy saving. When the DL throughput falls below 5 Mbps the CL should automatically optimize QoE. Therefore, there are two trigger associations in this case, one for going above 5 Mbps and the other for going below 5 Mbps.
2. The CLgcgsP sets thresholdCrossing values in the appropriate Fault or Performance service producer (in this case: Performance threshold monitoring service producer in TS28.532 and the performance threshold management service in item 7.4 of TS 28.550)
a. Acknowledgement: Success
3. The CLgcgsP verifies that the control loop exists with a control loop manager entity. Control loop manager is the entity that is responsible for the management of control loops in the network or respective management domain, and in this embodiment includes the ability of the setting of the CL goals.
a. Reply: CL1 exists
4. Acknowledgment: Trigger to CL goal change association successfully configured.
5. At some point in the future, the DL throughput crosses over 5 Mbps to a value of 6 Mbps.
6. A notifyThresholdCrossing (TS28.532) notification is received by the CLgcgsP
a. The CLgcgsP changes the goal of CL1 using the CL Manager or the entities in the closed loop. Example: using the procedure described in 28.536 v16.0.0
b. Confirmation of CL1 goal change
7. Since the notification for CL goal changed are enabled in step 1, a notification is sent to the ACLC. This may include further details of the CL.
a. The ACLC can decide to change the CL goal directly.
Note that CLscgS could be implemented as part of the CL Manager or other entities within the closed loop.
Solution 4
FIG. 10 illustrates an exemplary scenario sequence diagram 1000 for enabling triggers in a control loop, such as for use in an implementation for use with the European Telecommunications Standards Institute (ETSI) Zero touch network & Service Management (ZSM) Standard.

Figure 10:
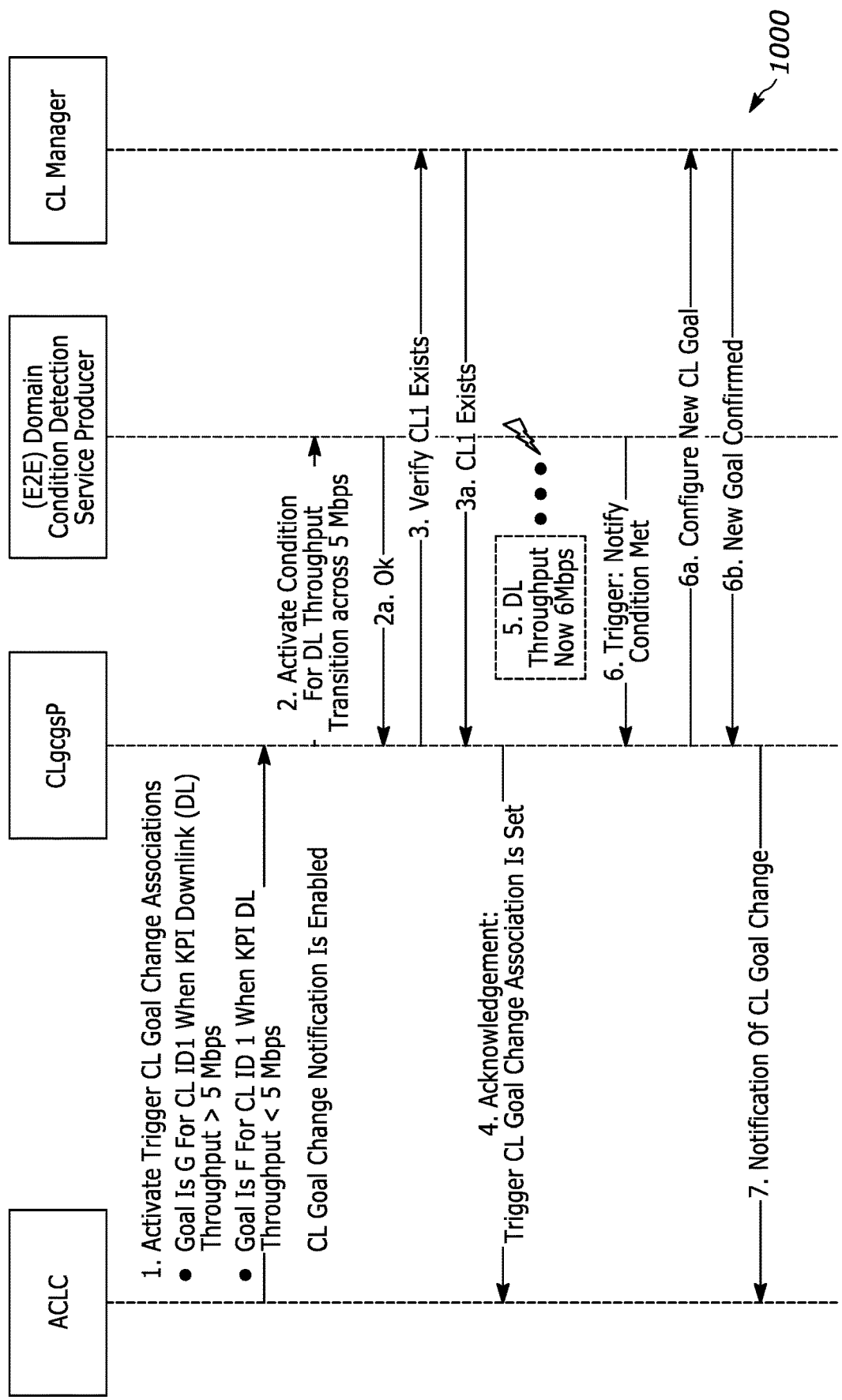
FIG. 10 is an exemplary scenario sequence diagram for enabling triggers in a control loop, such as for use in an implementation for use with the European Telecommunications Standards Institute (ETSI) Zero touch network & Service Management (ZSM) Standard.

More specifically, an implementation based on the ZSM framework shown in FIG. 10 would be identical to the SA5 embodiment except that the Performance/Fault MnS provider is replaced by the E2E or the Domain condition detection service implementation. The (E2E) Domain Condition detection service is described in ETSI GS ZSM 002 V1.1.1. Correspondingly steps 2 and 6 refer to activating conditions and notifying condition change respectively. CL Manager is an implementation of the CL governance service in ZSM009-1 v0.8.5 including a capability for managing the goal configuration of a given CL, in addition. Note that CLgcgS could be implemented as part of the CL Manager.

The embodiments for solution 4 are generally identical to the embodiments for solution 3, except for step 1. Here instead of step 1 of solution 3, a first goal and list of trigger-goal change associations is configured at the CL Manager. The CL manager then configures the triggers at the CLgcgsP. The rest of the step 2-8 can be identical.

As noted previously, in accordance with at least some embodiments of the present application the goal of control loops can be changed, based on a trigger in the network. The present application provides a trigger which could be any event in the network or the respective management domain. The present application further provides a method, interface/management service and the implementing entity, which is used to manage and activate this trigger and managing the associated CL state changes. The present application still further provides a notification with detailed status and relevant information when a state change happens.

This can enable dynamic changes in the control loops' goal under specific conditions or other events. For example, an energy can be better optimized during off peak hours to shut down managed elements (example: resources) not being used. The trigger here is the change in time of day or the network load and the closed loop goal transition can be to set a goal with a proportionally higher value of a for optimizing minimize ($\alpha E-\beta QOE+\gamma COST$) (with network load decreasing below a certain threshold, or time of the day) and optionally decreasing a back (when network load increases again beyond a certain threshold).

Figure 11:
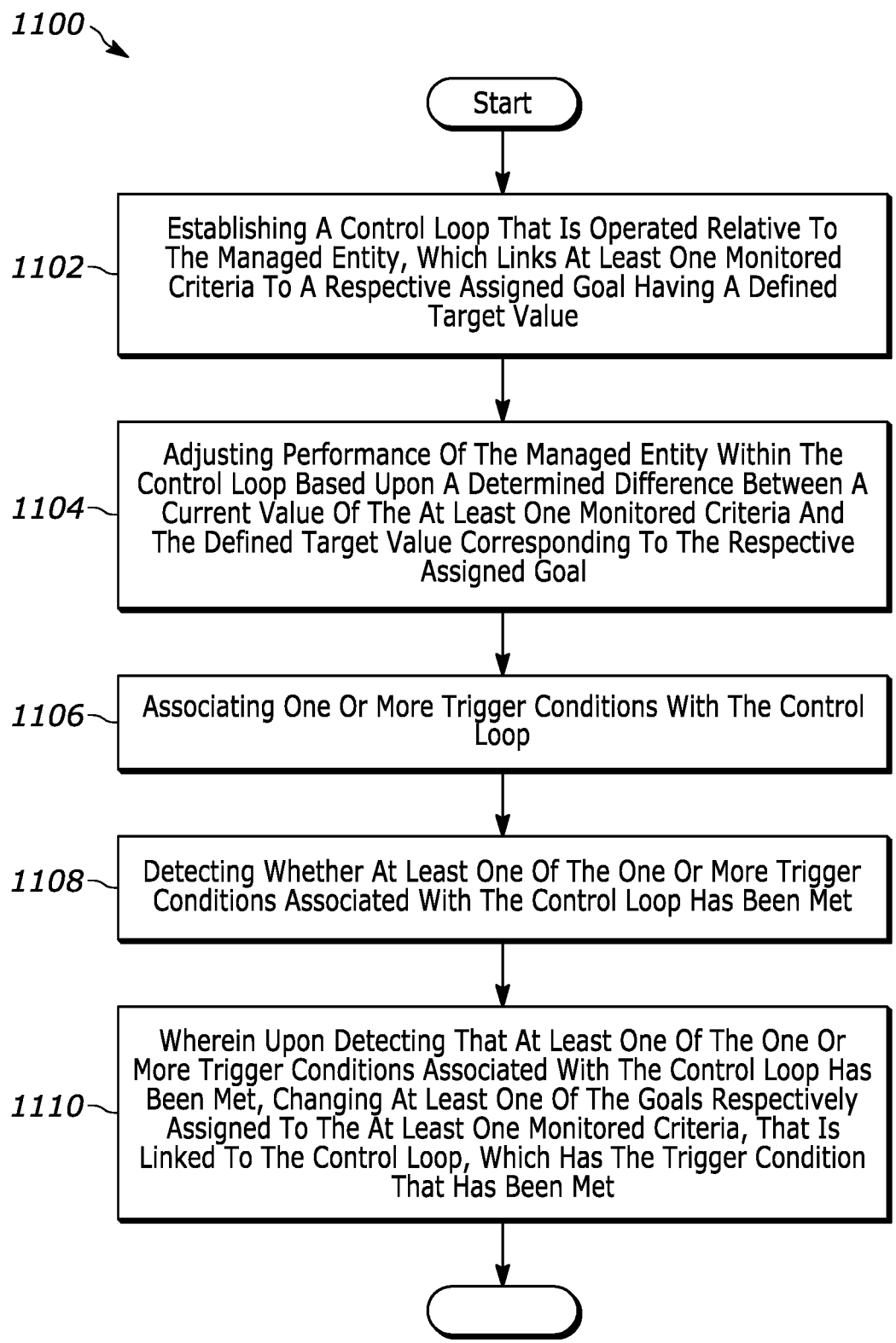
FIG. 11 is a flow diagram in a management entity for controlling an execution of a managed entity operating within a network including event triggered goal change for one or more control loops, according to a possible embodiment.

FIG. 11 illustrates a flow diagram 1100 in a management entity for controlling an execution of a managed entity operating within a network including event triggered goal change for one or more control loops, according to a possible embodiment. In accordance with at least one embodiment, the method can include establishing 1102 a control loop that is operated relative to the managed entity, which links at least one monitored criteria to a respective assigned goal having a defined target value. Performance of the managed entity within the control loop is adjusted 1104, based upon a determined difference between a current value of the at least one monitored criteria and the defined target value corresponding to the respective assigned goal. One or more trigger conditions are associated 1106 with the control loop. A detection 1108 is then made as to whether at least one of the one or more trigger conditions associated with the control loop has been met. Upon detecting that at least one of the one or more trigger conditions associated with the control loop has been met, at least one of the goals respectively assigned to the at least one monitored criteria, that is linked to the control loop, which has the trigger condition that has been met is changed 1110.

In some instances, the adjustment of performance of the managed entity as part of operation of the control loop can be repeated one or more times.

In some instances, the detection as to whether at least one of the one or more trigger conditions associated with the control loop has been met can be repeated one or more times as part of operation of the control loop.

In some instances, changing the goal can include changing the defined target value.

In some instances, changing the goal can include changing the particular criteria that is being monitored.

In some instances, the control loop can includes multiple monitored criteria, each of the multiple monitored criteria having a different respective assigned goal, wherein each of the respectively assigned goals has a corresponding weighting relative to the adjustment of performance. In some of these instances, changing the goal can include adjusting the weightings of each of the respectively assigned goals. Further, a weighting having a value of zero can cause consideration of a particular monitored criteria to be suspended.

In some instances, adjusting performance of the managed entity can include attempts to better optimize the performance of the managed entity relative to the respective assigned goal of each of the at least one monitored criteria. For example, in instances where a general minimization is desired, the target value can be set to zero, or negative infinity where negative values are possible. In instances where a general maximization is desired, the target value can be set to infinity. In some instances, the target value can be associated with a key performance indicator.

In some instances, upon detecting the at least one of the one or more trigger conditions, a notification can be sent via a transceiver to another entity operating within the network. In some of these instances, the notification can include an identification of any changes in the respective assigned goals.

In some instances, detecting whether at least one of the one or more trigger conditions associated with the control loop has been met can include receiving a notification that at least one of the one or more trigger conditions associated with the control loop has been met from another network entity.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 12:
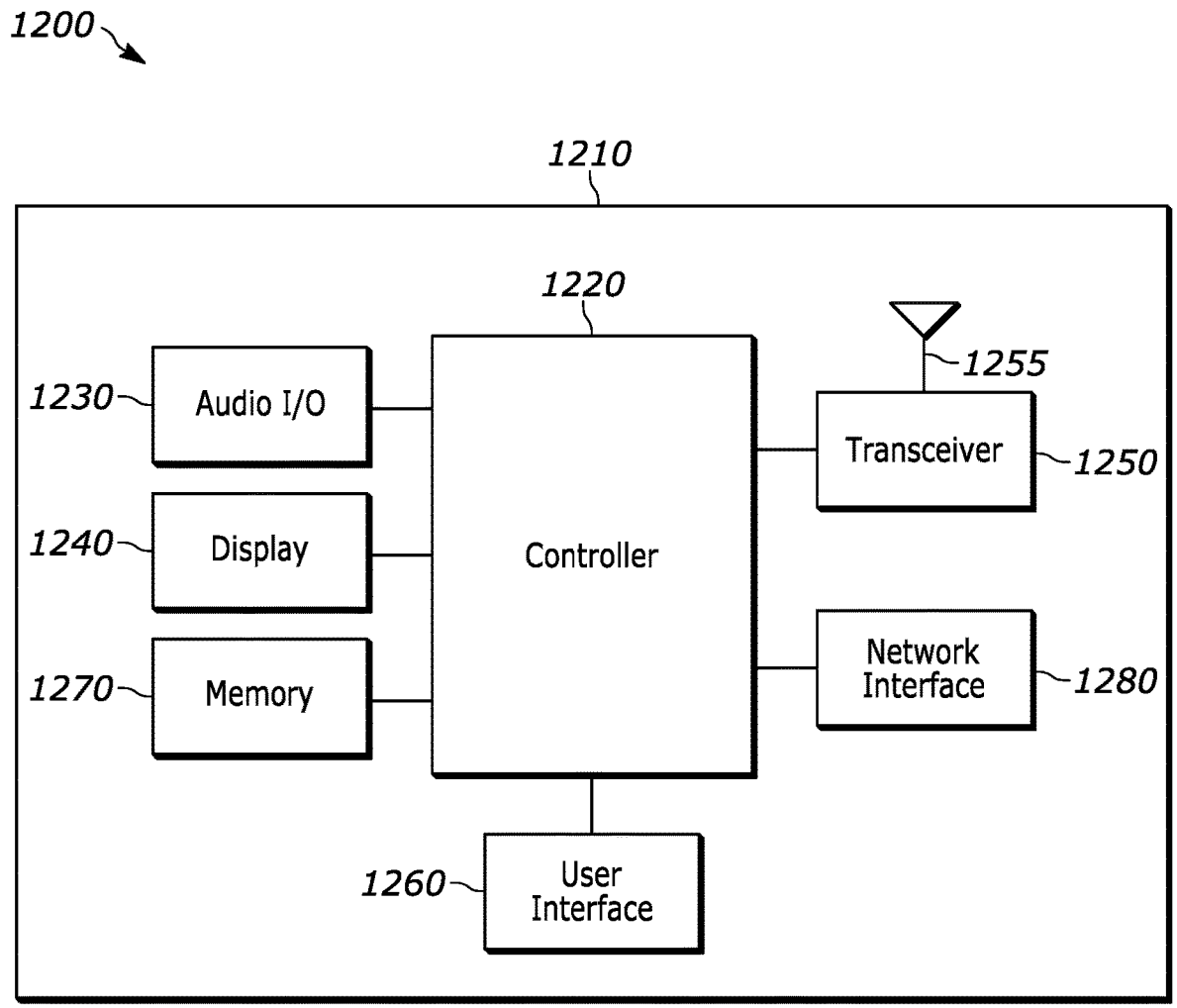
FIG. 12 is an example block diagram of an apparatus according to a possible embodiment.

FIG. 12 is an example block diagram of an apparatus 1200, such as the wireless communication device 110, according to a possible embodiment. The apparatus 1200 can include a housing 1210, a controller 1220 within the housing 1210, audio input and output circuitry 1230 coupled to the controller 1220, a display 1240 coupled to the controller 1220, a transceiver 1250 coupled to the controller 1220, an antenna 1255 coupled to the transceiver 1250, a user interface 1260 coupled to the controller 1220, a memory 1270 coupled to the controller 1220, and a network interface 1280 coupled to the controller 1220. The apparatus 1200 can perform the methods described in all the embodiments.

The display 1240 can be a viewfinder, a liquid crystal display (LCD), a light emitting diode (LED) display, a plasma display, a projection display, a touch screen, or any other device that displays information. The transceiver 1250 can include a transmitter and/or a receiver. The audio input and output circuitry 1230 can include a microphone, a speaker, a transducer, or any other audio input and output circuitry. The user interface 1260 can include a keypad, a keyboard, buttons, a touch pad, a joystick, a touch screen display, another additional display, or any other device useful for providing an interface between a user and an electronic device. The network interface 1280 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1270 can include a random access memory, a read only memory, an optical memory, a solid state memory, a flash memory, a removable memory, a hard drive, a cache, or any other memory that can be coupled to an apparatus.

The apparatus 1200 or the controller 1220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1270 or elsewhere on the apparatus 1200. The apparatus 1200 or the controller 1220 may also use hardware to implement disclosed operations. For example, the controller 1220 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1220 may be any controller or processor device or devices capable of operating an apparatus and implementing the disclosed embodiments. Some or all of the additional elements of the apparatus 1200 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A device implementing a management entity for wireless communication, comprising:
   at least one memory; and
   at least one processor coupled with the at least one memory and configured to cause the device to:
      obtain a configuration associated with a control loop, the configuration indicating a target performance criteria of a managed entity associated with the device and one or more trigger conditions to update a target value of the target performance criteria within the control loop, wherein the target performance criteria is associated with a plurality of target values comprising the target value, and wherein respective target values of the plurality of target values are associated with a weighting relative to an adjustment of operation of the managed entity;
      adjust, by the management entity and within the control loop, operation of the managed entity based on the weighting of the respective target values and a difference between a current value of the target performance criteria of the managed entity and the target value of the target performance criteria of the managed entity;
      detect at least one trigger condition of the one or more trigger conditions;
      perform the update to the target value of the target performance criteria based on the at least one trigger condition; and
      adjust, by the management entity and within the control loop, the operation of the managed entity based on the weighting of the respective target values and a difference between the current value of the target performance criteria of the managed entity and the updated target value of the target performance criteria.

2. The device implementing the management entity of claim 1, wherein the at least one processor is further configured to cause the device to repeat the adjustment of operation of the managed entity within the control loop one or more times.

3. The device implementing the management entity of claim 1, wherein the at least one processor is further configured to cause the device to repeat the detection of the at least one trigger condition one or more times within the control loop.

4. The device implementing the management entity of claim 1, wherein the update to the target value of the target performance criteria comprises one or more of adding a new term to the control loop, removing an existing term from the control loop, updating a weight associated with the existing term, or updating one or more conditional statements associated with the control loop.

5. The device implementing the management entity of claim 1, wherein the update to the target value of the target performance criteria comprises replacing first performance criteria with second performance criteria different from the first performance criteria.

6. The device implementing the management entity of claim 1, wherein the at least one processor is configured to cause the device to obtain a weight distribution associated with the weighting based on the respective target values overlapping.

7. The device implementing the management entity of claim 1, wherein the update to the target value of the target performance criteria comprises adjusting the weighting of the respective target values.

8. The device implementing the management entity of claim 7, wherein the at least one processor is further configured to cause the device to suspend monitoring of a monitored criteria of the target performance criteria based on the weighting of the respective target values associated with the monitored criteria having a value of zero.

9. The device implementing the management entity of claim 7, wherein adjusting operation of the managed entity is based on the respective target values.

10. The device implementing the management entity of claim 1, wherein the at least one processor is further configured to cause the device to transmit, responsive to detecting the at least one trigger condition, a notification to another device.

11. The device implementing the management entity of claim 10, wherein the notification indicates the updated target value of the target performance criteria.

12. The device implementing the management entity of claim 1, wherein to detect the at least one trigger condition, the at least one processor is configured to cause the device to receive, from another device, a notification that the at least one trigger condition is met.

13. The device implementing the management entity of claim 1, wherein the device is a user equipment (UE).

14. The device implementing the management entity of claim 1, wherein the device is a network entity (NE).

15. The device implementing the management entity of claim 1, wherein the management entity is the managed entity.

16. A method performed by a device implementing a management entity for wireless communication, the method comprising:
obtaining a configuration associated with a control loop, the configuration indicating a target performance criteria of a managed entity associated with the device and one or more trigger conditions to update a target value of the target performance criteria within the control loop, wherein the target performance criteria is associated with a plurality of target values comprising the target value, and wherein respective target values of the plurality of target values are associated with a weighting relative to an adjustment of operation of the managed entity;
adjusting, by the management entity and within the control loop, operation of the managed entity based on the weighting of the respective target values and a difference between a current value of the target performance criteria of the managed entity and the target value of the target performance criteria of the managed entity;
detecting at least one trigger condition of the one or more trigger conditions;
performing the update to the target value of the target performance criteria based on the at least one trigger condition; and
adjusting, by the management entity and within the control loop, the operation of the managed entity based on the weighting of the respective target values and a difference between the current value of the target performance criteria of the managed entity and the updated target value of the target performance criteria.

17. A processor for wireless communication, comprising:
at least one controller coupled with at least one memory and configured to cause the processor to:
obtain a configuration associated with a control loop, the configuration indicating a target performance criteria of a managed entity and one or more trigger conditions to update a target value of the target performance criteria within the control loop, wherein the target performance criteria is associated with a plurality of target values comprising the target value, and wherein respective target values of the plurality of target values are associated with a weighting relative to an adjustment of operation of the managed entity;
adjust, within the control loop, operation of the managed entity based on the weighting of the respective target values and a difference between a current value of the target performance criteria of the managed entity and the target value of the target performance criteria of the managed entity;
detect at least one trigger condition of the one or more trigger conditions;
perform the update to the target value of the target performance criteria based on the at least one trigger condition; and
adjust, within the control loop, the operation of the managed entity based on the weighting of the respective target values and a difference between the current value of the target performance criteria of the managed entity and the updated target value of the target performance criteria.

18. The processor of claim 17, wherein the at least one controller is further configured to cause the processor to repeat the adjustment of operation of the managed entity within the control loop one or more times.

19. The processor of claim 17, wherein the at least one controller is further configured to cause the processor to repeat the detection of the at least one trigger condition one or more times within the control loop.

20. The processor of claim 17, wherein the update to the target value of the target performance criteria comprises one or more of adding a new term to the control loop, removing an existing term from the control loop, updating a weight associated with the existing term, or updating one or more conditional statements associated with the control loop.

\* \* \* \* \*